United States Patent
Lee et al.

(10) Patent No.: US 8,255,084 B2
(45) Date of Patent: Aug. 28, 2012

(54) METHOD, MEDIUM, AND APPARATUS FOR DOCKING MOBILE ROBOT

(75) Inventors: Su-jin Lee, Yongin-si (KR); Hyeon Myeong, Yongin-si (KR); Woo-yeon Jeong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1134 days.

(21) Appl. No.: 12/153,601

(22) Filed: May 21, 2008

(65) Prior Publication Data

US 2009/0177320 A1  Jul. 9, 2009

(30) Foreign Application Priority Data

Jan. 4, 2008 (KR) .................. 10-2008-0001404

(51) Int. Cl.
*G06F 17/00* (2006.01)
*G05B 23/02* (2006.01)

(52) U.S. Cl. .... 700/258; 700/253; 701/301; 318/568.16
(58) Field of Classification Search ............. 318/568.17; 701/24
See application file for complete search history.

(56) References Cited

U.S. PATENT DOCUMENTS

| | | | |
|---|---|---|---|
| 6,532,404 B2 * | 3/2003 | Colens | 700/262 |
| 7,015,831 B2 * | 3/2006 | Karlsson et al. | 340/995.1 |
| 7,263,412 B2 | 8/2007 | Gutmann et al. | |
| 7,501,780 B2 * | 3/2009 | Yamamoto | 318/587 |
| 7,706,917 B1 * | 4/2010 | Chiappetta et al. | 700/245 |
| 7,970,491 B2 * | 6/2011 | Lee et al. | 700/245 |
| 8,055,382 B2 * | 11/2011 | Myeong et al. | 700/253 |
| 2004/0249504 A1 | 12/2004 | Gutmann et al. | |
| 2005/0213082 A1 * | 9/2005 | DiBernardo et al. | 356/139.03 |
| 2006/0012493 A1 * | 1/2006 | Karlsson et al. | 340/995.24 |
| 2007/0233319 A1 * | 10/2007 | Im et al. | 700/245 |
| 2007/0280052 A1 * | 12/2007 | Kong et al. | 367/128 |
| 2008/0091304 A1 * | 4/2008 | Ozick et al. | 700/258 |

FOREIGN PATENT DOCUMENTS

| | | |
|---|---|---|
| JP | 2003-166824 | 6/2003 |
| KR | 10-2004-0089883 | 10/2004 |
| KR | 10-2005-0044967 | 5/2005 |
| KR | 10-2006-0037008 | 5/2006 |
| KR | 10-2006-0086231 | 7/2006 |

* cited by examiner

*Primary Examiner* — Thomas G. Black
*Assistant Examiner* — Lin B Olsen
(74) *Attorney, Agent, or Firm* — Staas & Halsey LLP

(57) ABSTRACT

Provided are a method, medium, and apparatus for docking a mobile robot. The method includes: (a) receiving a docking signal, which is transmitted from a signal transmitting unit, by using a signal receiving unit loaded in the mobile robot while the mobile robot is moving; (b) estimating a range of poses of the signal transmitting unit based on the received docking signal; (c) updating estimated poses of the signal transmitting unit by reflecting the estimated range of poses in a pose estimation algorithm when the pose of the signal transmitting unit, which was estimated using the pose estimation algorithm, exists within the estimated range of poses and adding a new pose of the signal transmitting unit, which is to be estimated using the pose estimation algorithm by reflecting the estimated range of poses, when the pose of the signal transmitting unit, which was estimated using the pose estimation algorithm, does not exist within the estimated range of poses; and (d) attempting to return the mobile robot to a charging station by using a plurality of poses of the signal transmitting unit, which were estimated by repeating operations (a) through (c) and using the pose estimation algorithm, in order of accuracy, until the mobile robot is docked in the charging station.

21 Claims, 7 Drawing Sheets

METHOD, MEDIUM, AND APPARATUS FOR DOCKING MOBILE ROBOT

CROSS-REFERENCE TO RELATED APPLICATIONS

This application claims priority benefit from Korean Patent Application No. 10-2008-0001404 filed on Jan. 4, 2008 in the Korean Intellectual Property Office, the disclosure of which is incorporated herein by reference in its entirety.

BACKGROUND

1. Field

The present invention relates to a method, medium, and apparatus for docking a mobile robot, and more particularly, to a method, medium, and apparatus for updating or adding a candidate estimated pose of a signal transmitting unit whenever detecting a docking signal while a mobile robot moves and attempting to dock the mobile robot by using a plurality of candidate estimated poses in order of accuracy.

2. Description of the Related Art

With the technological development, various forms of robots, in particular, mobile robots, have recently been introduced. Mobile robots, such as cleaning robots and security robots, carry out tasks in place of human beings while autonomously traveling at home.

A mobile robot, which travels autonomously, includes a battery. Therefore, when the voltage of the battery is low, the mobile robot returns to a charging station and charges the battery.

If the mobile robot is aware of the position of the charging station on the entire map, it can return to the position and charge its battery. However, the position of the charging station may be changed by a user, and the mobile robot may not be aware of the initial position of the charging station. To address this problem, the charging station transmits a docking signal, and the mobile robot detects the docking signal and attempts to return to the charging station.

However, if the mobile robot cannot detect the docking signal when attempting to return to the charging station, it wanders randomly or makes a wall-following motion until detecting the docking signal. That is, the mobile robot has to make additional motions.

In addition, when the mobile robot detects a docking signal reflected by the wall or the floor, it may wrongly recognize the position of the charging station and attempt to return to a wrong position.

SUMMARY

According to an aspect of the present invention, there is provided a method, medium, and apparatus for updating or adding a candidate estimated pose of a charging station whenever detecting a docking signal while a mobile robot moves and, even when failing to detect the docking signal, enabling the mobile robot to immediately return to the charging station by using a plurality of candidate estimated poses in order of accuracy, so that the mobile robot can return to the charging station with increased accuracy.

According to an aspect of the present invention, there is provided a method of docking a mobile robot, the method including (a) receiving a docking signal, which is transmitted from a signal transmitting unit, by using a signal receiving unit loaded in a mobile robot while the mobile robot is moving; (b) estimating a range of poses of the signal transmitting unit based on the received docking signal; (c) updating estimated poses of the signal transmitting unit by reflecting the estimated range of poses in an pose estimation algorithm when the pose of the signal transmitting unit, which was estimated using the pose estimation algorithm, exists within the estimated range of poses and adding a new pose of the signal transmitting unit, which is to be estimated using the pose estimation algorithm by reflecting the estimated range of poses, when the pose of the signal transmitting unit, which was estimated using the pose estimation algorithm, does not exist within the estimated range of poses; and (d) attempting to return the mobile robot to a charging station by using a plurality of poses of the signal transmitting unit, which were estimated by repeating operations (a) through (c) and using the pose estimation algorithm, in order of accuracy, until the mobile robot is docked in the charging station.

According to another aspect of the present invention, there is provided an apparatus for docking a mobile robot, the apparatus including a signal transmitting unit to transmit a docking signal; a signal receiving unit which is loaded in a mobile robot and which receives the docking signal while the mobile robot is moving; an pose range estimating unit to estimate a range of poses of the signal transmitting unit based on the received docking signal; a determination unit to determine whether a pose of the signal transmitting unit, which was estimated using a pose estimation algorithm, exists within the estimated range of poses; a pose adding/updating unit to update estimated poses of the signal transmitting unit by reflecting the estimated range of poses in the pose estimation algorithm based on the determination result of the determination unit or adding a new pose of the signal transmitting unit, which is to be estimated using the pose estimation algorithm by reflecting the estimated range of poses; and a docking control unit which attempts to return the mobile robot to a charging station by using a plurality of poses of the signal transmitting unit, which were estimated by the pose adding/updating unit, in order of accuracy, until the mobile robot is docked in the charging station.

BRIEF DESCRIPTION OF THE DRAWINGS

These and/or other aspects, features, and advantages will become apparent and more readily appreciated from the following description of exemplary embodiments, taken in conjunction with the accompanying drawings of which.

DETAILED DESCRIPTION OF EMBODIMENTS

Figure 1:
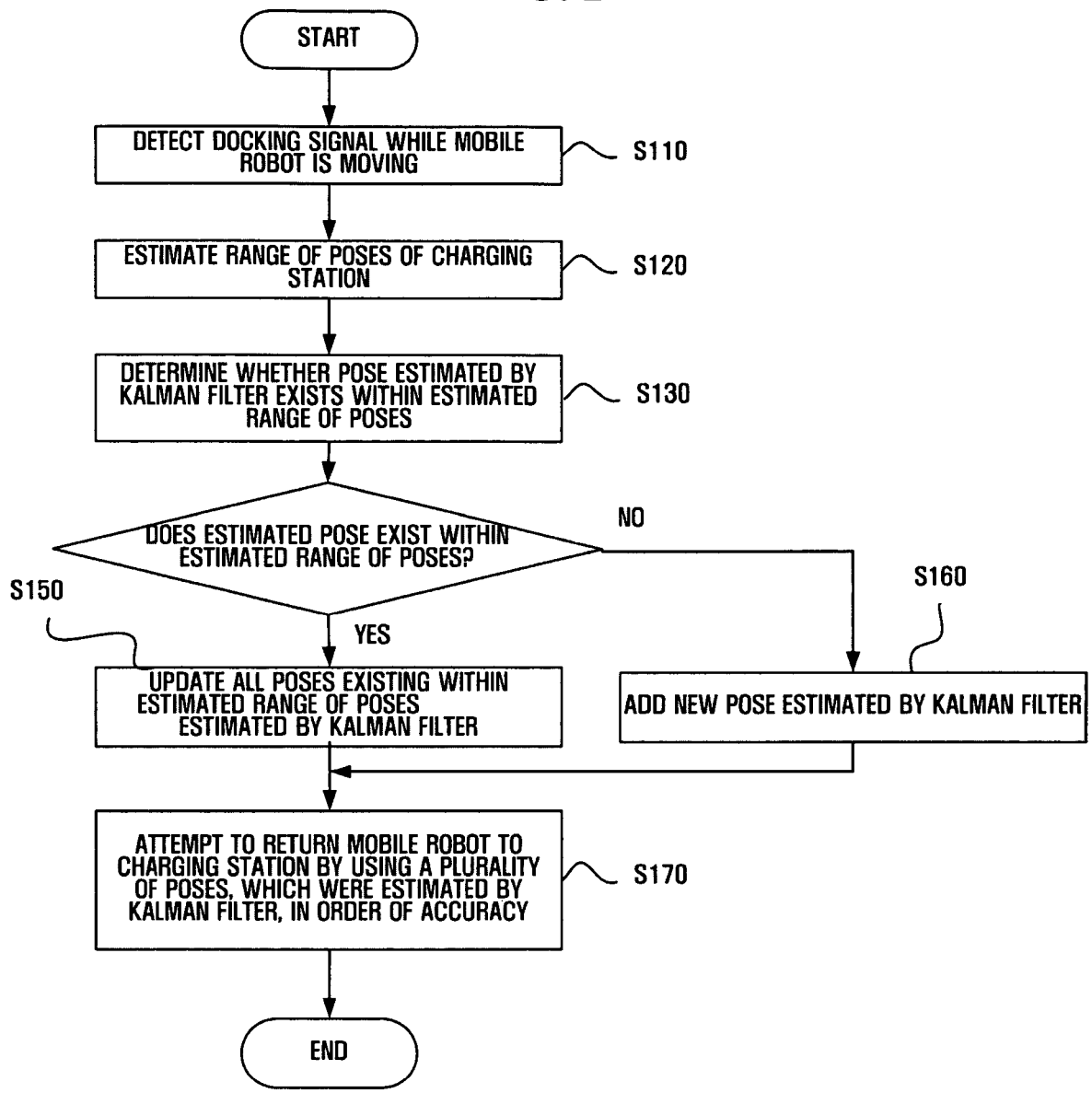
FIG. 1 is a flowchart illustrating a method of docking a mobile robot according to an exemplary embodiment of the present invention.

Reference will now be made in detail to exemplary embodiments, examples of which are illustrated in the accompanying drawings, wherein like reference numerals refer to the like elements throughout. Exemplary embodiments are described below to explain the present invention by referring to the figures.

The present invention may, however, be embodied in many different forms and should not be construed as being limited to exemplary embodiments set forth herein. Rather, these exemplary embodiments are provided so that this disclosure will be thorough and complete and will fully convey the concept of the invention to those skilled in the art, and the present invention will be defined by the appended claims and equivalents.

Hereinafter, an apparatus and method for docking a mobile robot according to exemplary embodiments of the present invention will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, implement the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a flowchart illustrating a method of docking a mobile robot 200 according to an exemplary embodiment of the present invention.

Referring to FIG. 1, the mobile robot 200 autonomously travels along a path. For example, if the mobile robot 200 is a cleaning robot, it may clean a zone while moving along a cleaning path in the zone.

While autonomously moving along a path, a signal receiving unit 220 (see FIG. 7) included in the mobile robot 200 may receive a docking signal from a signal transmitting unit 210 (see FIG. 7) (operation S110). In an exemplary embodiment of the present invention, the signal transmitting unit 210 may be placed at a charging station of the mobile robot 200 and transmit the docking signal. That is, the mobile robot 200 may identify the position of the signal transmitting unit 210, which is placed at the charging station, return to the identified position of the charging station, and charge its battery. Here, the docking signal transmitted from the signal transmitting unit 210 may be an infrared signal, and the signal receiving unit 220 may be an infrared sensor.

Figure 2:
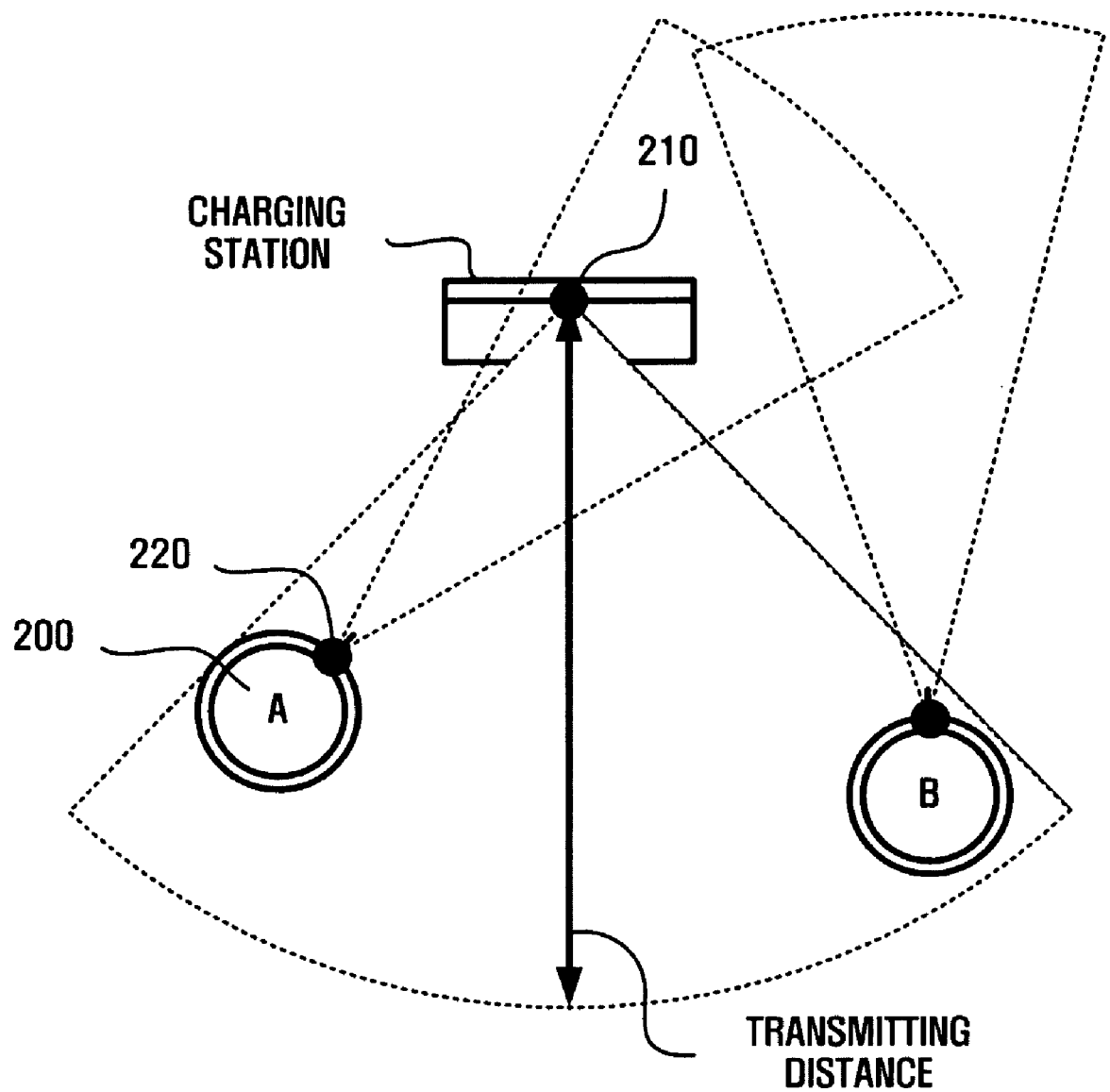
FIG. 2 is a diagram for explaining a case where a signal receiving unit having a predetermined receiving range detects a docking signal transmitted from a signal transmitting unit having a predetermined transmitting range.

FIG. 2 is a diagram for explaining a case where the signal receiving unit 220 having a predetermined receiving range detects a docking signal transmitted from the signal transmitting unit 210 having a predetermined transmitting range. The signal transmitting unit 210 located at the charging station transmits a docking signal, and the signal receiving unit 220 included in the mobile robot 200 detects the docking signal.

Referring to FIG. 2, a fan-shaped region extending from the signal transmitting unit 210 is a transmitting range which a docking signal transmitted from the signal transmitting unit 210 can reach. In addition, a fan-shaped region extending from the signal receiving unit 220 included in the mobile robot 200 is a receiving range within which the signal receiving unit 220 can receive a docking signal.

In order for the mobile robot 200 to detect a docking signal transmitted from the charging station, the signal transmitting unit 210 of the charging station must be located within the receiving range of the signal receiving unit 220 of the mobile robot 200, and the signal receiving unit 220 must be located within the transmitting range of the signal transmitting unit 210. For example, if the mobile robot 200 is located at a position A of FIG. 2, it can detect a docking signal since the signal transmitting unit 210 is located within the receiving range of the signal receiving unit 220 and the signal receiving unit 220 is located within the transmitting range of the signal transmitting unit 210.

However, if the mobile robot 200 is located at a position B, it cannot detect the docking signal since the signal transmitting unit 210 is not located within the receiving range of the signal receiving unit 220 although the signal receiving unit 220 is located within the transmitting range of the signal transmitting unit 210. Thus, if the mobile robot 200 detects a docking signal, the charging station may be located in a region which corresponds to the receiving range of the signal receiving unit 220 included in the mobile robot 200.

Referring back to FIG. 1, after the mobile robot 200 detects the docking signal while on the move, a pose range estimating unit 230 (see FIG. 7) may estimate the range of poses of the signal transmitting unit 210 based on the docking signal (operation S120). As used herein, pose denotes the position of the signal transmitting unit 210 and a direction angle at which the signal transmitting unit 210 transmits a docking signal. That is, the range of poses denotes the range of a region, in which the signal transmitting unit 210 can be located, and the range of direction angles of a docking signal, which is transmitted from the signal transmitting unit 210, when the mobile robot 200 receives the docking signal. A method of calculating the range of a region in which the signal transmitting unit 210 can be located and the range of direction angles of a docking signal transmitted from the signal transmitting unit 210 will now be described.

In general, a receiving distance of an infrared signal is greater than a transmitting distance thereof. Therefore, if a docking signal is detected, the charging station is located within a distance, which corresponds to the transmitting distance of the signal transmitting unit 210, from the signal receiving unit 220. Therefore, when the signal receiving unit 220 receives a docking signal, the region in which the signal transmitting unit 210 can be located may be estimated based on the transmitting distance of the signal transmitting unit 210, the range of angles at which the signal receiving unit 220 can receive a docking signal, and the pose of the mobile robot 200. Here, the pose of the mobile robot 200 denotes the position and direction angle of the mobile robot 200.

Figure 3:
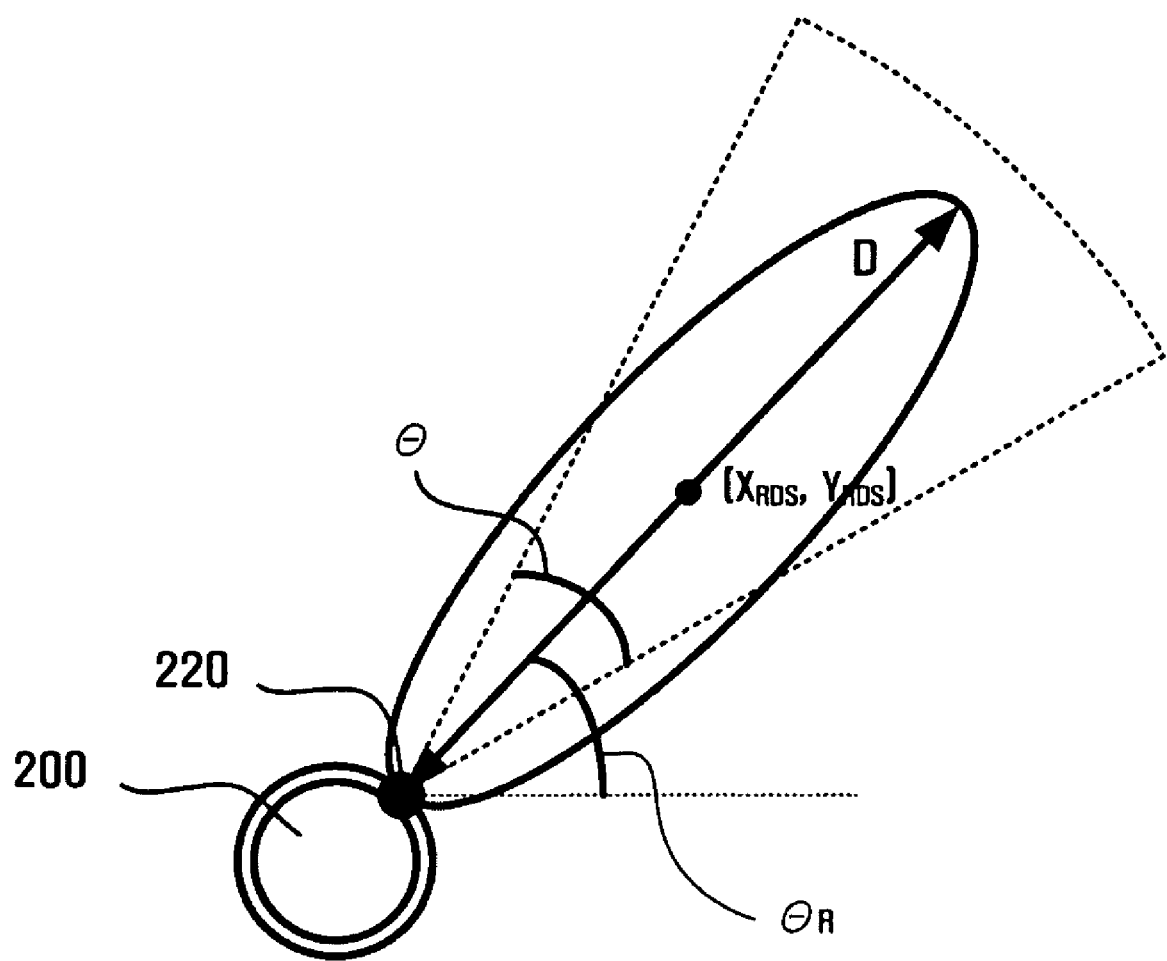
FIG. 3 is a diagram for explaining the range of positions of the signal transmitting unit when the signal receiving unit detects a docking signal according to an exemplary embodiment of the present invention.

FIG. 3 is a diagram for explaining the range of positions of the signal transmitting unit 210 when the signal receiving unit 220 detects a docking signal according to an exemplary embodiment of the present invention.

When the signal receiving unit 220 detects a docking signal, a region in which the signal transmitting unit 210 can be located may approximate to an oval, the length of whose long axis corresponds to a transmitting distance D of the signal transmitting unit 210 as illustrated in FIG. 3. Here, the position of the signal receiving unit 220 is defined as $(X_R, Y_R)$, and a receiving angle of the signal receiving unit 220 is defined as $\Theta_R$. In this case, the position of the signal receiving unit 220 can be obtained based on the position of the mobile robot 200 and the position of the signal receiving unit 220 in the mobile robot 200 with respect to the center of the mobile robot 200. However, for the simplicity of description, it will be assumed that the position of the signal receiving unit 220 is identical to that of the mobile robot 200. In addition, the direction of the signal receiving unit 220 need not match the direction in which the mobile robot 200 moves. However, for the simplicity of description, it will be assumed that the direction of the signal receiving unit 220 matches the direction in which the mobile robot 200 moves.

When the transmitting distance of the signal transmitting unit 210 is D, a center point $(X_{RDS}, Y_{RDS})$ of the oval may be given by Equation (1).

$$X_{RDS} = X_R + (D/2)*\cos(\Theta_R)$$

$$YRDS = YR + (D/2)*\sin(\Theta R) \tag{1}$$

In addition, the length of a short axis of the oval may be defined by $2*(D/2)*\tan(\Theta/2)$, where $\Theta$ indicates the range of angles at which the signal receiving unit 220 can receive a docking signal. Therefore, if the signal receiving unit 220 detects a docking signal, it can be determined that the signal transmitting unit 210 is located within the oval. The size of the oval may be changed according to the accuracy of the position of the mobile robot 200. When it is determined that the accuracy of the position of the mobile robot 200 is low, the lengths of the long and short axes of the oval may be increased.

Instead of approximating the region, in which the signal transmitting unit 210 can be located, to an oval as described above, it may be determined that the signal transmitting unit 210 exists in a fan-shaped region with a radius of D and an angle of $\Theta$. That is, the region in which the signal transmitting unit 210 can be located may be defined in various ways based on the range of angles at which the signal receiving unit 220 receives a signal, the transmitting distance of the signal transmitting unit 210, and the pose of the mobile robot 200.

A process of calculating the range of direction angles of a docking signal transmitted from the signal transmitting unit 210 will now be described with reference to FIGS. 4 and 5.

Figure 4:
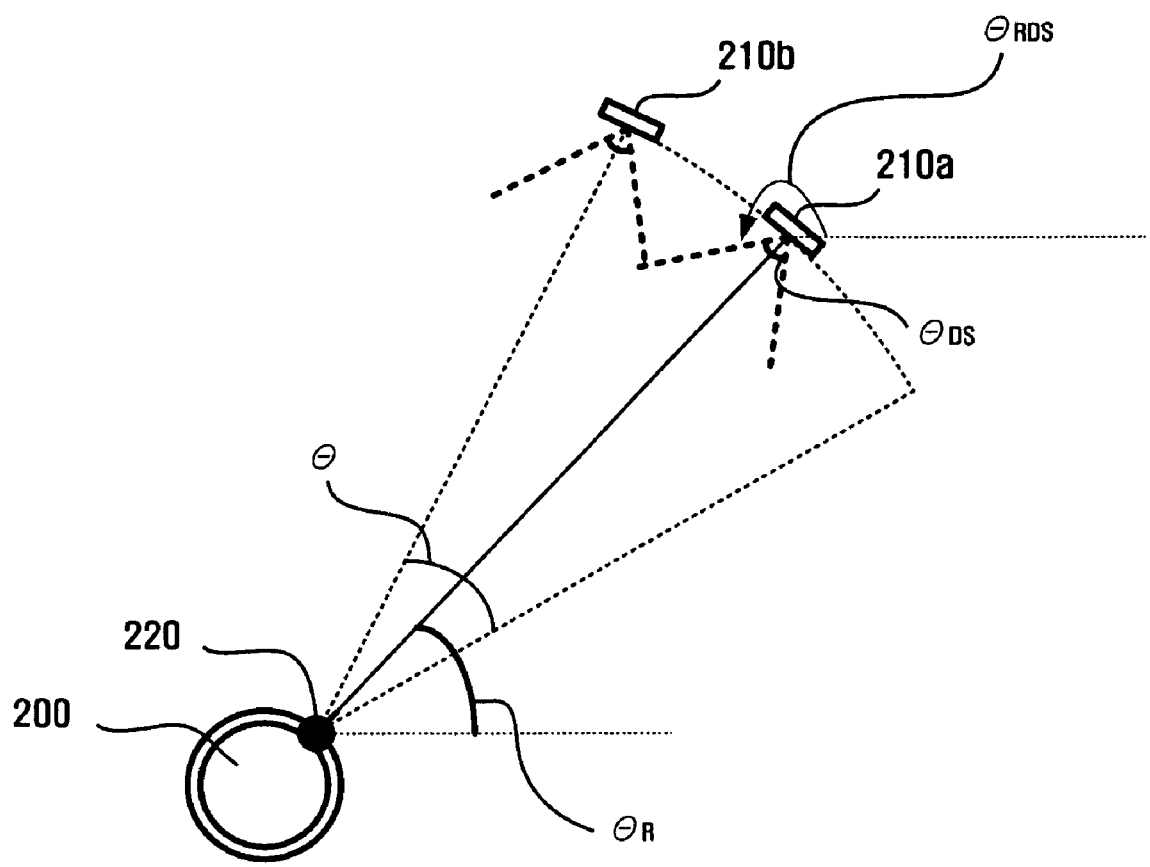
FIGS. 4 and 5 are diagrams for explaining the range of direction angles of the signal transmitting unit when the signal receiving unit detects a docking signal according to an exemplary embodiment of the present invention.
Figure 5:
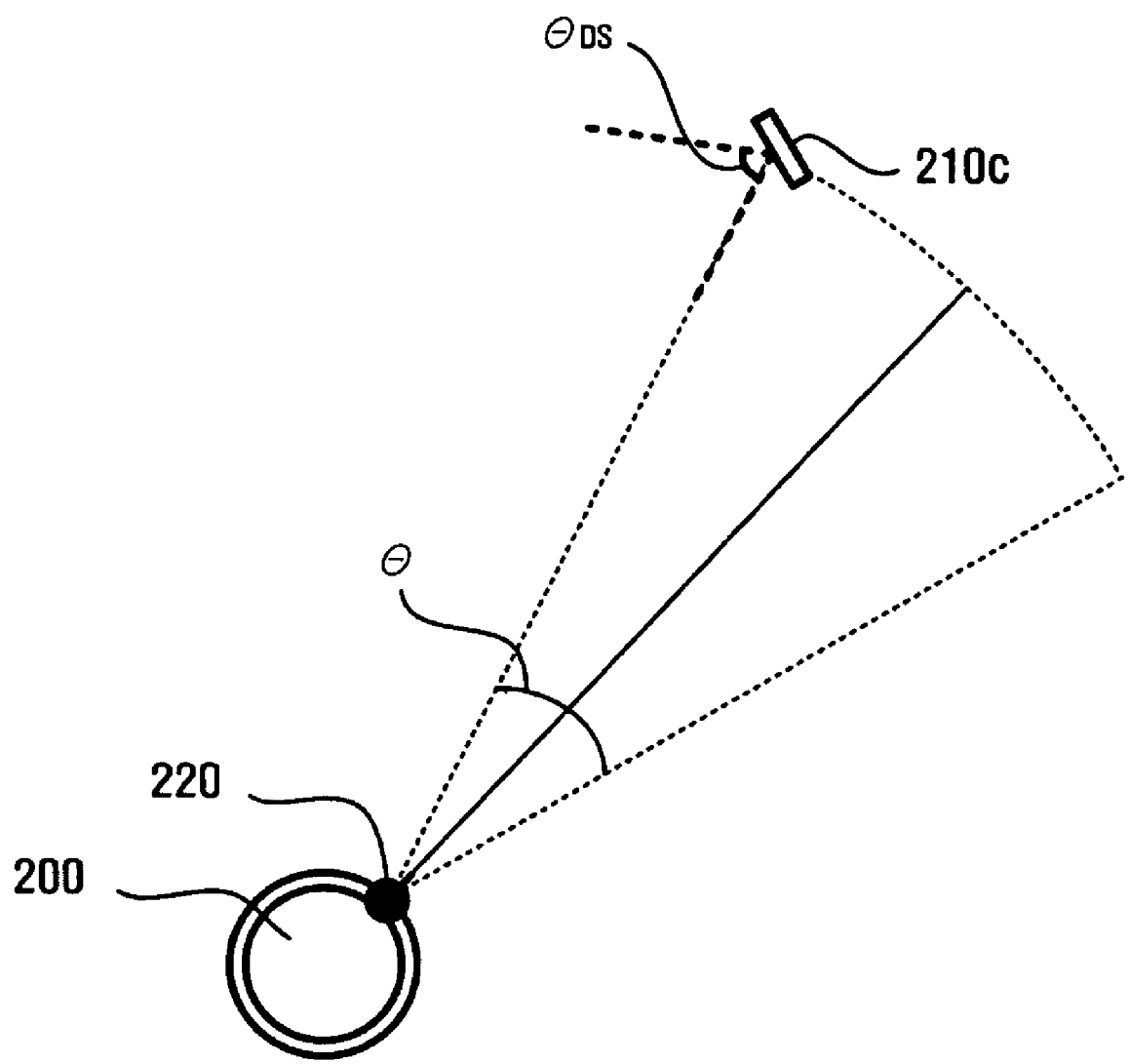

FIGS. 4 and 5 are diagrams for explaining the range of direction angles of the signal transmitting unit 210 when the signal receiving unit 220 detects a docking signal according to an exemplary embodiment of the present invention.

Referring to FIG. 4, a fan shape of FIG. 4 corresponds to the signal receiving range of the signal receiving unit 220. In this case, if the direction angle of the signal transmitting unit 210 at a position 210a, which is right in the middle of an arc of the fan shape, is $\Theta_{RDS}$, the signal transmitting unit 210 directly faces the signal receiving unit 220. Thus, the direction angle $\Theta_{RDS}$ may be given by Equation (2).

$$\Theta_{RDS} = \Theta_R + 180° \tag{2}$$

If the signal transmitting unit 210 faces the signal receiving unit 220 from an end 210b of the arc of the fan shape, the direction angle of the signal transmitting unit 210 is given by $\Theta_{RDS} + (\Theta/2)$.

Referring to FIG. 5, the signal transmitting unit 210 is located at a position 210c which is identical to the end 210b of FIG. 4. However, if pose of the signal transmitting unit 210 in an extreme case where the signal receiving unit 220 detects a docking signal transmitted from the signal transmitting unit 210, as like 210c, is taken into consideration, the direction angle of the signal transmitting unit 210 at the position 210c is an angle obtained after the direction angle of the transmitting unit 210 at the end 210b is rotated by $\Theta_{DS}/2$ in a clockwise direction. In this case, $\Theta_{DS}$ denotes the range of angles at which the signal transmitting unit 210 transmits a docking signal. Therefore, the direction angle of the signal transmitting unit 210 at the position 210c is given by $\Theta_{RDS} + (\Theta/2) - (\Theta_{DS}/2)$.

That is, the direction angle of the signal transmitting unit 210 may have a value within the range of $\pm(\Theta - \Theta_{DS})/2$ from $\Theta_{RDS}$. The range of direction angles of the signal transmitting unit 210 may be increased according to the accuracy of the position of the mobile robot 200.

When the signal receiving unit 220 receives a docking signal, it can estimate the range of poses of the signal transmitting unit 210 as described above.

Referring back to FIG. 1, after the range of poses of the signal transmitting unit 210 is estimated, it is determined whether a pose of the signal transmitting unit 210 estimated using a pose estimation algorithm exists within the estimated range of poses (operation S130). In this case, a Kalman filter may be used as a pose estimation algorithm in order to estimate a pose of the signal transmitting unit 210 based on the received docking signal. A method of updating and adding a pose of the signal transmitting unit 210 using the Kalman filter will now be described.

The Kalman filter is an algorithm widely used to estimate a value of an optimal state variable by repeating prediction and update operations at each observation. When a system equation and an observation equation of a state variable x are $$x_K = F_K x_{K-1} + B_K u_K + w_k \text{—System equation}$$

$$z_K = H_K x_K + v_K \text{—Observation equation} \tag{3}$$

(where $F_K$ indicates a state transition matrix connecting a current state variable and a next state variable, $u_K$ indicates an input variable, $w_k$ indicates system noise, $z_K$ indicates an observation value, and $v_K$ indicates observation noise), the Kalman filter may predict the state variable using Equation (4) and update the state variable using Equation (5).

$$\hat{x}_{k|k-1} = F_K \hat{x}_{k-1|k-1} + B_K u_k \text{—Predicted state variable equation}$$

$$P_{k|k-1} = F_K P_{k-1|k-1} F_k^T + Q_k \text{—Predicted co-variance matrix,} \tag{4}$$

where $\hat{x}$ indicates a predicted state variable, P indicates a co-variance matrix, and Q indicates a matrix representing the dispersion of noise.

$$\tilde{y}_k = z_k - H_k \hat{x}_{k|k-1}$$

$$K_k = P_{k|k-1} H_k^T (H_k P_{k|k-1} H_k^T + R_k)$$

$\hat{x}_{k|k} = \hat{x}_{k|k-1} + K_k \tilde{y}_k$ —Updated state variable equation $P_{k|k} = (I - K_k H_k) P_{k|k-1}$ —Updated co-variance matrix, (5)

where K indicates a Kalman gain matrix.

In an exemplary embodiment of the present invention, a charging station may be a stationary system, and an input variable may be zero. In addition, the position and direction angle of the signal transmitting unit 210 may be set to state variables. In this case, Equations (3) through (5) may be rearranged into Equations (6) through (8), respectively.

$x_K = x_{K-}$ —System equation $z_K = x_K + v_K$ —Observation equation (6).

$\hat{x}_{k|k-1} = \hat{x}_{k-1|k-1}$ —Predicted state variable equation $P_{k|k-1} = P_{k-1|k-1}$ —Predicted co-variance matrix (7).

$\tilde{y}_k = z_k - \hat{x}_{k|k-1}$ $K_k = P_{k|k-1}(P_{k|k-1} + R_k)$ $\hat{x}_{k|k} = \hat{x}_{k|k-1} + K_k \tilde{y}_k$ —Updated state variable equation $P_{k|k} = (I - K_k) P_{k|k-1}$ —Updated co-variance matrix (8).

Whenever the signal receiving unit 220 detects a docking signal, measurement values $(X_{RDS}, Y_{RDS}, \Theta_{RDS})$ may be reflected in the Kalman filter to update the pose of the signal transmitting unit 210 estimated using the Kalman filter.

As described above, after the signal receiving unit 220 receives a docking signal, the range of poses of the signal transmitting unit 210 is estimated. If a pose of the signal transmitting unit 210 estimated by the Kalman filter exists within the estimated range of poses, the Kalman filter is updated based on received measurement values to obtain a new pose estimate of the signal transmitting unit 210 (operation S150). If the estimated range of poses includes a plurality of poses of the signal transmitting unit 210 estimated by the Kalman filter, each of the estimated poses of the signal transmitting unit 210 is updated. If no pose of the signal transmitting unit 210 estimated by the Kalman filter exists within the estimated range of poses, a pose newly estimated by the Kalman filter based on the measurement values is added (operation S160).

When an $n^{th}$ pose of the signal transmitting unit 210, which is estimated by the Kalman filter, is $(X_{RDS}, Y_{RDS}, \Theta_{RDS})_{KFn}$, if $(X_{RDS}, Y_{RDS})_{KFn}$ exists within the range (within the oval in FIG. 3) of positions of the signal transmitting unit 210 which is estimated based on a currently received docking signal (condition 1) and if $|(\Theta_{RDS})_{KFn} - \Theta_{RDS}| < |(\Theta - \Theta_{DS})/2|$ is satisfied (condition 2), it can be determined that the $n^{th}$ pose of the signal transmitting unit 210 estimated by the Kalman filter exists within the range of poses of the signal transmitting unit 210 which is estimated based on the currently received docking signal. If there are a plurality of poses of the signal transmitting unit 210, which are estimated by the Kalman filter and satisfy the above two conditions, within the estimated range of poses of the signal transmitting unit 210, each of the poses of the signal transmitting unit 210 estimated by the Kalman filter is updated by reflecting the measurement values $(X_{RDS}, Y_{RDS}, \Theta_{RDS})$ which are obtained from the currently received docking signal. When no pose of the signal transmitting unit 210 estimated by the Kalman filter exists within the range of poses which is estimated based on the currently received docking signal, a new pose of the signal transmitting unit 210, which is estimated by the Kalman filter using the current measurement values $(X_{RDS}, Y_{RDS}, \Theta_{RDS})$ as state variables and a co-variance function $$P = \begin{bmatrix} D^2 & 0 & 0 \\ 0 & D^2 & 0 \\ 0 & 0 & \left(\frac{\theta - \theta_{DS}}{2}\right)^2 \end{bmatrix}$$

as an initial value, may be added.

When the mobile robot 200 detects a docking signal while moving autonomously, it may update or add a pose of the signal transmitting unit 210, which is estimated by the Kalman filter, as described above. Thus, in the present invention, even if the mobile robot 200 fails to detect a docking signal when attempting to return to the charging station, there is no need for the mobile robot 200 to wander randomly or make a wall-following motion. Instead, the mobile robot 200 can attempt to return to the charging station by using a plurality of estimated positions of the charging station in order of accuracy. Hereinafter, a process, in which the mobile robot 200 attempts to return to the charging station based on a plurality of estimated positions of the charging station, will be described.

While the mobile robot 200 is traveling autonomously, if the remaining capacity of the battery of the mobile robot 200 becomes less than a predetermined level or if the mobile robot 200 receives a command from a user to return to the charging station, the mobile robot 200 attempts to return to the charging station by using a plurality of poses of the signal transmitting unit 210, which are estimated by the Kalman filter as described above, in order of accuracy (operation S170).

Figure 6:
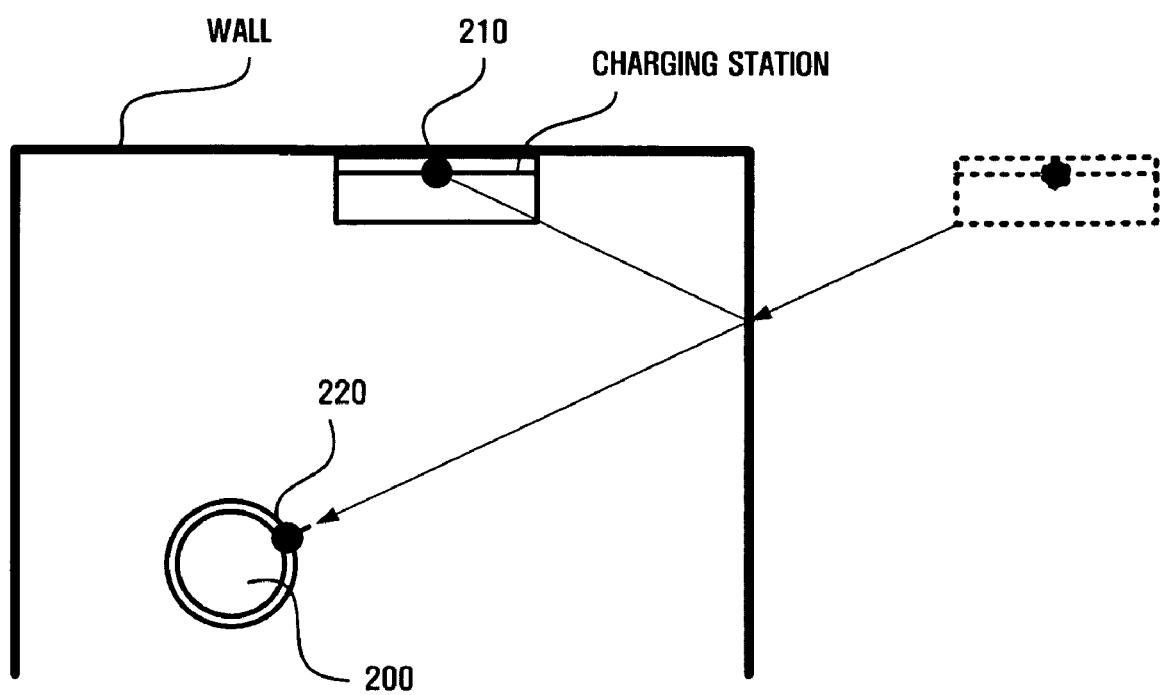
FIG. 6 is a diagram for explaining a case where the position of the signal transmitting unit is wrongly determined when the signal receiving unit receives a signal which is transmitted from the signal transmitting unit and then reflected by the wall.

Occasionally, a signal transmitted from the signal transmitting unit 210 of the charging station is reflected by the wall or the floor, and the signal receiving unit 220 receives the reflected signal. FIG. 6 is a diagram for explaining a case where the position of the signal transmitting unit 210 is wrongly determined when the signal receiving unit 220 receives a signal which is transmitted from the signal transmitting unit 210 and then reflected by the wall. When the signal receiving unit 220 receives the reflected signal as illustrated in FIG. 6, it may wrongly determine that the signal transmitting unit 210 is located at a position symmetrical to the wall.

Signals reflected by the wall or the floor are less frequently and irregularly detected by the signal receiving unit 220, as compared to signals directly received from the signal transmitting unit 210 without being reflected. In addition, the probability of a signal being reflected increases when the intensity of the signal is higher and vice versa. That is, the probability of a signal being reflected depends on the intensity of the signal. Therefore, as the number of times that a pose of the signal transmitting unit 210 is updated using the Kalman filter increases, the pose of the signal transmitting unit 210 estimated by the Kalman filter is closer to the actual pose of the signal transmitting unit 210. In addition, as the intensity of a signal received by the signal receiving unit 220 is lower, the probability that measurement values obtained from a real signal instead of a reflected signal may have been used is higher. In addition, when the position of the charging station is moved by a user or when measurement values of the charging station are moved from an initial measured position since the position of the mobile robot 200 is wrongly recognized for reasons such as a slip, the higher the number of times that a pose of the signal transmitting unit 210 has recently been updated by the Kalman filter, the closer the pose to the real pose of the signal transmitting unit 210.

Therefore, different weights may be assigned to a plurality of poses of the signal transmitting unit 210 which have been estimated by the Kalman filter as described above. That is, a higher weight may be assigned to a pose which has been more frequently updated, which was estimated based on a docking signal whose intensity was lower when received by the signal receiving unit 220, and which has recently been more frequently updated. Then, the estimated poses of the signal transmitting unit 210 may be listed in order of accuracy. Accordingly, the mobile robot 200 attempts to dock with the charging station by using the estimated pose with highest accuracy. When the mobile robot 200 fails to dock with the charging station, it makes another attempt by using the estimated pose with next highest accuracy.

In this regard, the present invention can increase docking accuracy since a pose wrongly estimated based on a signal reflected by the wall or the floor is filtered in order of accuracy from among a plurality of poses estimated by the Kalman filter. In addition, even when a user moves a charging station or when the position of the charging station is changed due to, for example, the slip of the mobile robot 200, the present invention can increase docking accuracy by adding a pose newly estimated by the Kalman filter.

Figure 7:
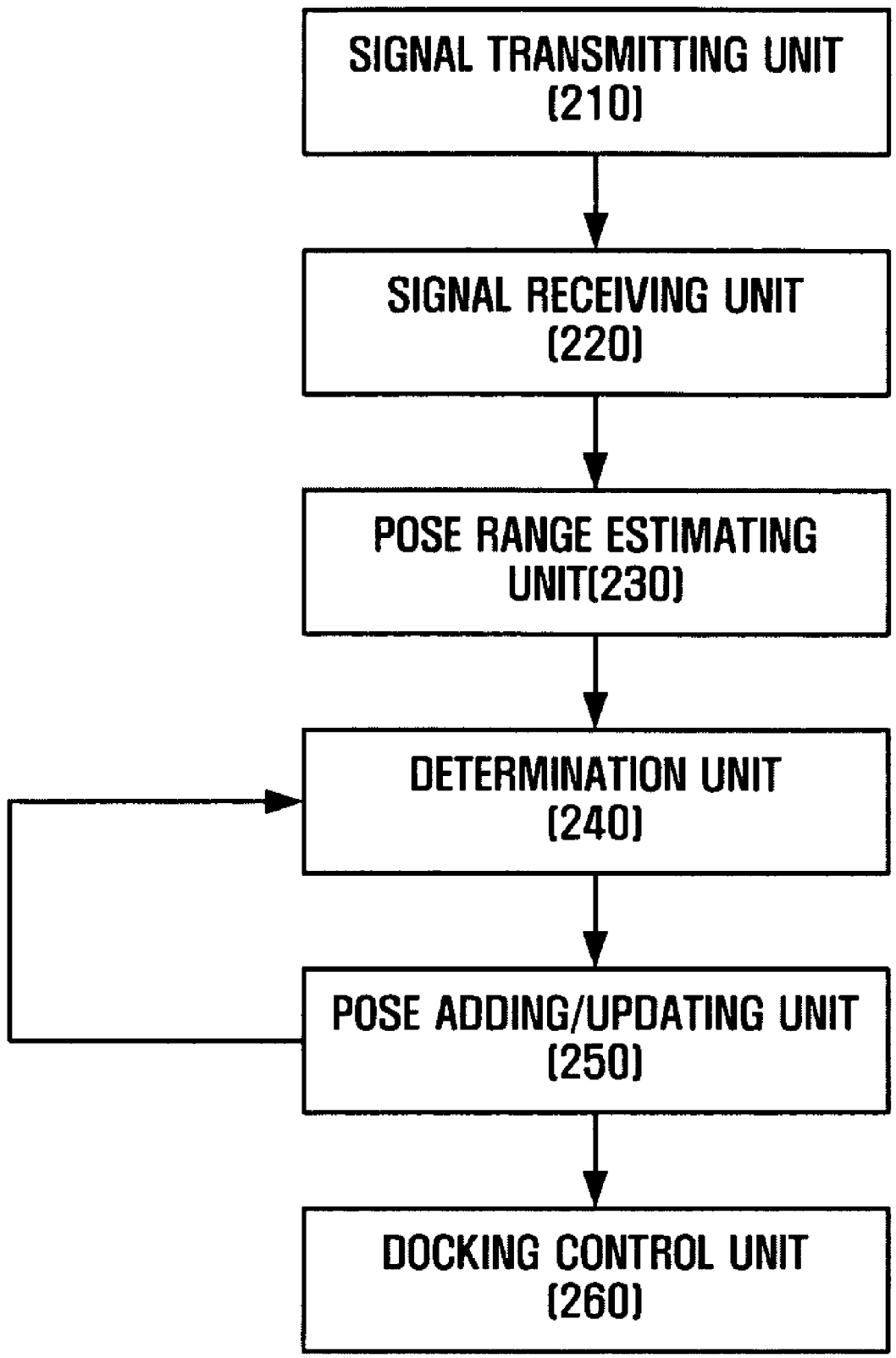
FIG. 7 is a block diagram of an apparatus for docking a mobile robot according to an exemplary embodiment of the present invention.

FIG. 7 is a block diagram of an apparatus for docking the mobile robot 200 according to an exemplary embodiment of the present invention. Referring to FIG. 7, the apparatus includes the signal transmitting unit 210, the signal receiving unit 220, the pose range estimating unit 230, a determination unit 240, a pose adding/updating unit 250, and a docking control unit 260.

Each unit used in the present embodiment may also be implemented as a module. The term 'module', as used herein, denotes, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and units or modules or further separated into additional components and modules.

The signal transmitting unit 210 transmits a docking signal. In this case, the docking signal may be an infrared signal. The signal transmitting unit 210 may be located at a charging station and transmit a docking signal.

The signal receiving unit 220 is loaded in the mobile robot 200 and receives a signal transmitted from the signal transmitting unit 210 while the mobile robot 200 moves autonomously.

The pose range estimating unit 230 estimates the range of poses of the signal transmitting unit 210 based on the received docking signal. As used herein, pose denotes the position of the signal transmitting unit 210 and a direction angle at which the signal transmitting unit 210 transmits a docking signal. Here, the range of positions of the signal transmitting unit 210 can be estimated based on the pose of the mobile robot 200, the transmitting distance of the docking signal, and the range of angles at which the signal receiving unit 220 can receive the docking signal. In addition, the range of direction angles at which the signal transmitting unit 210 transmits a docking signal can be estimated based on the direction angle of the mobile robot 200, the range of angles at which the signal receiving unit 220 can receive the docking signal, and the range of angles at which the signal transmitting unit 210 transmits a signal. Since the method of estimating a pose of the signal transmitting unit 210 has been described above, a description thereof will be omitted.

The determination unit 240 determines whether a pose of the signal transmitting unit 210 estimated using a pose estimation algorithm exists within the estimated range of poses. In this case, the Kalman filter algorithm may be used as the pose estimation algorithm.

The pose adding/updating unit 250 updates or adds a pose of the signal transmitting unit 210, which was estimated using the pose estimation algorithm, by reflecting the range of poses estimated by the pose range estimating unit 230 in the pose estimation algorithm based on the determination result of the determination unit 240. Specifically, when the determination unit 240 determines that the pose of the signal transmitting unit 210 estimated using the pose estimation algorithm exists within the range of poses estimated by the pose range estimating unit 230, the pose adding/updating unit 250 updates the poses of the signal transmitting unit 210. When the determination unit 240 determines that the pose of the signal transmitting unit 210 estimated using the pose estimation algorithm does not exist within the range of poses estimated by the pose range estimating unit 230, the signal adding/updating unit 250 adds a newly estimated pose of the signal transmitting unit 210.

The docking control unit 260 controls the mobile robot 200 to attempt to return to the charging station by using a plurality of poses of the signal transmitting unit 210, which were estimated by the pose adding/updating unit 250, in order of accuracy. In this case, a pose of the signal transmitting unit 210, which has been more frequently updated by the pose adding/updating unit 250, may be determined to have higher accuracy. In addition, a pose which was estimated based on a docking signal whose intensity was lower when received by the signal receiving unit 220 may be determined to have higher accuracy. Also, a pose, which has recently been more frequently updated by the pose adding/updating unit 250, may be determined to have higher accuracy.

In addition to the above described exemplary embodiments, exemplary embodiments of the present invention can also be implemented through computer readable code/instructions in/on a medium, e.g., a computer readable medium, to control at least one processing element to implement any above described exemplary embodiment. The medium can correspond to any medium/media permitting the storing and/or transmission of the computer readable code/instructions.

The computer readable code/instructions can be recorded/transferred on a medium in a variety of ways, with examples of the medium including computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), a CD-R (Recordable)/Rewritable, and DVD-R (Recordable/Rewritable). The media may also be a distributed network, so that the computer readable code/instructions is/are stored/transferred and executed in a distributed fashion. Still further, as only an example, the processing element could include a processor or a computer processor, and processing elements may be distributed and/or included in a single device.

For example, exemplary embodiments can be implemented in computing hardware (computing apparatus) and/or software, such as (in a non-limiting example) any computer that can store, retrieve, process and/or output data and/or communicate with other computers. Software includes computer readable code/instructions. The computer readable code/instructions may form a program. The results produced by the implementation of the software can be displayed on a display of the computing hardware. A program/software implementing exemplary embodiments may be recorded on computer-readable media comprising computer-readable recording media discussed above. The program/software implementing exemplary embodiments may also be transmitted over transmission communication media. An example of transmission communication media includes a carrier-wave signal.

Further, according to an aspect of exemplary embodiments, any combination of the described features, functions and/or operations can be implemented.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of docking a mobile robot, the method comprising:
    (a) receiving a docking signal, which is transmitted from a signal transmitting unit, by using a signal receiving unit loaded in the mobile robot while the mobile robot is moving;
    (b) estimating a range of poses of the signal transmitting unit based on the received docking signal;
    (c) updating estimated poses of the signal transmitting unit by reflecting the estimated range of poses in a pose estimation algorithm when a pose of the signal transmitting unit, which was estimated using the pose estimation algorithm, exists within the estimated range of poses and adding a new pose of the signal transmitting unit, which is to be estimated using the pose estimation algorithm by reflecting the estimated range of poses, when the pose of the signal transmitting unit, which was estimated using the pose estimation algorithm, does not exist within the estimated range of poses; and
    (d) attempting to return the mobile robot to a charging station by using a plurality of poses of the signal transmitting unit, which were estimated by repeating operations (a) through (c) and using the pose estimation algorithm, in order of accuracy, until the mobile robot is docked in the charging station.

2. The method of claim 1, wherein the signal transmitting unit transmits the docking signal from the charging station of the mobile robot.

3. The method of claim 1, wherein pose of the signal transmitting unit is the position of the signal transmitting unit and a direction angle at which the signal transmitting unit transmits the docking signal.

4. The method of claim 3, wherein range of positions of the signal transmitting unit is estimated based on pose of the mobile robot, transmitting distance of the docking signal, and range of angles at which the signal receiving unit can receive the docking signal.

5. The method of claim 3, wherein range of direction angles at which the signal transmitting unit transmits the docking signal is estimated based on direction angle of the mobile robot, range of angles at which the signal receiving unit can receive the docking signal, and range of angles at which the signal transmitting unit transmits the docking signal.

6. The method of claim 1, wherein the pose estimation algorithm is a Kalman filter.

7. The method of claim 1, wherein the accuracy of pose of the signal transmitting unit is increased as the number of times that the pose of the signal transmitting unit is updated increases.

8. The method of claim 1, wherein the accuracy of a pose of the signal transmitting unit is increased when the pose of the signal transmitting unit is estimated based on a docking signal whose intensity was lower when received by the signal receiving unit.

9. The method of claim 1, wherein the accuracy of pose of the signal transmitting unit is increased as the number of times that the pose of the signal transmitting unit has recently been updated increases.

10. The method of claim 1, wherein the docking signal transmitted from the signal transmitting unit is an infrared signal.

11. An apparatus for docking a mobile robot, the apparatus comprising:
    a signal transmitting unit to transmit a docking signal;
    a signal receiving unit which is loaded in a mobile robot and which receives the docking signal while the mobile robot is moving;
    a pose range estimating unit to estimate a range of poses of the signal transmitting unit based on the received docking signal;
    a determination unit to determine whether a pose of the signal transmitting unit, which was estimated using a pose estimation algorithm, exists within the estimated range of poses;
    a pose adding/updating unit to update estimated poses of the signal transmitting unit by reflecting the estimated range of poses in the pose estimation algorithm based on the determination result of the determination unit or adding a new pose of the signal transmitting unit, which is to be estimated using the pose estimation algorithm by reflecting the estimated range of poses; and
    a docking control unit which attempts to return the mobile robot to a charging station by using a plurality of poses of the signal transmitting unit, which were estimated by the pose adding/updating unit, in order of accuracy, until the mobile robot is docked in the charging station.

12. The apparatus of claim 11, wherein when the determination unit determines that pose of the signal transmitting unit, which was estimated using the pose estimation algorithm, exists within the estimated range of poses, the pose adding/updating unit updates the estimated pose of the signal transmitting unit, and when the determination unit determines that the estimated pose of the signal transmitting unit does not exist within the estimated range of poses, the pose adding/updating unit adds a new pose of the signal transmitting unit.

13. The apparatus of claim 11, wherein the signal transmitting unit transmits the docking signal from the charging station of the mobile robot.

14. The apparatus of claim 11, wherein pose of the signal transmitting unit is the position of the signal transmitting unit and a direction angle at which the signal transmitting unit transmits the docking signal.

15. The apparatus of claim 14, wherein the pose range estimating unit estimates range of positions of the signal transmitting unit based on pose of the mobile robot, transmitting distance of the docking signal, and range of angles at which the signal receiving unit can receive the docking signal.

16. The apparatus of claim 14, wherein the pose range estimating unit estimates range of direction angles, at which the signal transmitting unit transmits the docking signal, based on direction angle of the mobile robot, range of angles at which the signal receiving unit can receive the docking signal, and range of angles at which the signal transmitting unit transmits the docking signal.

17. The apparatus of claim 11, wherein the pose estimation algorithm is a Kalman filter.

18. The apparatus of claim 11, wherein the accuracy of pose of the signal transmitting unit is increased as the number of times that the pose of the signal transmitting unit is updated by the pose adding/updating unit increases.

19. The apparatus of claim 11, wherein the accuracy of pose of the signal transmitting unit is increased when the pose of the signal transmitting unit is estimated based on the docking signal whose intensity was lower when received by the signal receiving unit.

20. The apparatus of claim 11, wherein the accuracy of pose of the signal transmitting unit is increased as the number of times that the pose of the signal transmitting unit has recently been updated by the pose adding/updating unit increases.

21. The apparatus of claim 11, wherein the docking signal transmitted from the signal transmitting unit is an infrared signal.

* * * * *